(12) United States Patent
Yankovich et al.

(10) Patent No.: US 10,163,131 B2
(45) Date of Patent: Dec. 25, 2018

(54) THREE DIMENSIONAL PROXIMITY RECOMMENDATION SYSTEM (71) Applicant: eBay Inc., San Jose, CA (US)

(72) Inventors: Steve Yankovich, San Jose, CA (US); Ryan Melcher, Ben Lomond, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/936,473

(22) Filed: Nov. 9, 2015

(65) Prior Publication Data

US 2016/0063551 A1 Mar. 3, 2016

Related U.S. Application Data (63) Continuation of application No. 13/010,335, filed on Jan. 20, 2011, now Pat. No. 9,183,588.

(51) Int. Cl.
G06Q 30/02 (2012.01)
G06Q 30/06 (2012.01)
(Continued)

(52) U.S. Cl.
CPC ......... *G06Q 30/0256* (2013.01); *G06Q 30/02* (2013.01); *G06Q 30/0255* (2013.01); *G06Q 30/0277* (2013.01); *G06Q 30/0601* (2013.01); *G06Q 30/0641* (2013.01); *G06Q 30/0643* (2013.01); *G06T 19/20* (2013.01); *A63F 13/00* (2013.01); *A63F 2300/5546* (2013.01); *A63F 2300/5553* (2013.01); *A63F 2300/66* (2013.01); *A63F 2300/807* (2013.01); *A63F 2300/8082* (2013.01); *G06Q 30/00* (2013.01);
(Continued)

(58) Field of Classification Search
CPC ...... G06F 3/04815; G06F 3/011; H04L 67/22; H04L 67/306; H04N 21/812; H04N 7/157; H04N 21/4316; H04N 21/4725; G06T 15/00; G06T 15/20; H04W 4/02; H04W 4/206; H04W 4/028; H04W 4/185; H04W 4/003; A63F 2300/5546
See application file for complete search history.

(56) References Cited

U.S. PATENT DOCUMENTS 9,183,588 B2 11/2015 Yankovich et al.
9,186,588 B1 11/2015 Yankovich et al.
(Continued)

OTHER PUBLICATIONS

"U.S. Appl. No. 13/010,335, Examiner Interview Summary dated Jul. 7, 2015", 2 pgs.
(Continued)

*Primary Examiner* — Jwalant Amin
(74) *Attorney, Agent, or Firm* — Schwegman Lundberg & Woessner, P.A.

(57) ABSTRACT

In various example embodiments, systems and methods to provide proximity recommendations are provided. In example embodiments, data representing prioritized recommendations for a user is received. The data representing the prioritized recommendations is used to generated a composite visual representation by embedding select prioritized recommendations into a visual representation. The composite visual representation presents a higher prioritized recommendation in a more spatially prominent manner than a lower prioritized recommendation. The composite visual representation is then presented to the user.

20 Claims, 9 Drawing Sheets (51) Int. Cl.
*G06T 19/20* (2011.01)
*G06T 15/20* (2011.01)
*G06Q 30/00* (2012.01)
*A63F 13/00* (2014.01)
*G06T 15/00* (2011.01)
*G06T 19/00* (2011.01)

(52) U.S. Cl.
CPC .............. *G06T 15/00* (2013.01); *G06T 15/20* (2013.01); *G06T 19/00* (2013.01); *G06T 2210/16* (2013.01)

(56) References Cited

U.S. PATENT DOCUMENTS

| | | | | |
|---|---|---|---|---|
| 2001/0019328 | A1* | 9/2001 | Schwuttke | G06T 11/206 345/440 |
| 2002/0113809 | A1* | 8/2002 | Akazawa | G06F 3/04815 715/706 |
| 2007/0038944 | A1 | 2/2007 | Carignano et al. | |
| 2007/0113181 | A1* | 5/2007 | Blattner | G06F 3/011 715/706 |
| 2007/0168357 | A1* | 7/2007 | Mo | G06Q 10/04 |
| 2007/0265090 | A1* | 11/2007 | Barsness | A63F 13/12 463/42 |
| 2009/0037291 | A1* | 2/2009 | Dawson | G06Q 30/02 705/27.2 |
| 2009/0063983 | A1* | 3/2009 | Amidon | G06Q 30/02 715/733 |
| 2009/0076894 | A1* | 3/2009 | Bates | G06Q 30/02 705/14.61 |
| 2009/0204420 | A1 | 8/2009 | Ganz | |
| 2010/0037152 | A1 | 2/2010 | Bates et al. | |
| 2010/0138037 | A1* | 6/2010 | Adelberg | G06Q 10/087 700/241 |
| 2010/0162149 | A1 | 6/2010 | Sheleheda et al. | |
| 2011/0211040 | A1* | 9/2011 | Lindemann | G01C 11/02 348/36 |
| 2012/0188169 | A1 | 7/2012 | Yankovich et al. | |

OTHER PUBLICATIONS

"U.S. Appl. No. 13/010,335, Final Office Action dated Sep. 2, 2014", 24 pgs.
"U.S. Appl. No. 13/010,335, Final Office Action dated Oct. 1, 2013", 28 pgs.
"U.S. Appl. No. 13/010,335, Non Final Office Action dated Jan. 15, 2015", 37 pgs.
"U.S. Appl. No. 13/010,335, Non Final Office Action dated Mar. 27, 2014", 27 pgs.
"U.S. Appl. No. 13/010,335, Non Final Office Action dated Apr. 1, 2013", 18 pgs.
"U.S. Appl. No. 13/010,335, Notice of Allowance dated Jul. 7, 2015", 8 pgs.
"U.S. Appl. No. 13/010,335, Response filed Jan. 2, 2014 to Final Office Action dated Oct. 1, 2013", 12 pgs.
"U.S. Appl. No. 13/010,335, Response filed Jan. 2, 2015 to Final Office Action dated Sep. 2, 2014", 13 pgs.
"U.S. Appl. No. 13/010,335, Response filed May 15, 2015 to Non Final Office Action dated Jan. 15, 2015", 15 pgs.
"U.S. Appl. No. 13/010,335, Response filed Jun. 27, 2014 to Non Final Office Action dated Mar. 27, 2014", 11 pgs.
"U.S. Appl. No. 13/010,335, Response filed Jul. 1, 2013 to Non Final Office Action dated Apr. 1, 2013", 10 pgs.

* cited by examiner

THREE DIMENSIONAL PROXIMITY RECOMMENDATION SYSTEM

PRIORITY

This application is a continuation of and claims the benefit of priority to U.S. patent application Ser. No. 13/010,335, filed on Jan. 20, 2011, which is hereby incorporated by reference herein in its entirety.

FIELD

The present disclosure relates generally to the field of computer technology, and in a specific example embodiment, to providing recommendations to a user via a three-dimensional proximity recommendation system.

BACKGROUND

Conventionally, banner ads are placed in various locations of web pages being viewed by a user. The banner ads are usually positioned in a same level (in a two-dimensional space) as the main content of the web page. Furthermore, the banner ads are typically located in the peripheral regions of a display (e.g., bottom or sides of the web page) and are not integrated with the main content for display.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication and visual representation environment, the embodiments are given merely for clarity in disclosure. Thus, any type of electronic publication, electronic commerce, or electronic business system and method, including various system architectures, may employ various embodiments of the system and method described herein and be considered as being within a scope of example embodiments. Each of a variety of example embodiments is discussed in detail below.

Example embodiments described herein provide systems and methods for providing a three-dimensional proximity recommendation system. In example embodiments, potentially relevant products to be recommended to the user are determined. The potentially relevant products may be determined based, in part, on one or more attributes associated with a current visual representation being viewed, a past search history for products by the user, a past purchase history of the user, or any suitable combination thereof. The determined potentially relevant products are then prioritized based on one or more of a user profile, user preferences, past user purchase history, and past user browsing history, resulting in prioritized recommendations for the user.

In example embodiments, data representing the prioritized recommendations is received by a visual representation system. The data representing the prioritized recommendations is then embedded into a visual representation to generate a composite visual representation. The composite visual representation presents higher prioritized recommendations in a more spatially prominent manner than lower prioritized recommendations. For example, more relevant recommendations are positioned in closer proximity to a viewing user or an avatar of the user. The composite visual representation is then presented to the user. The user may then select a recommendation in order to obtain more details for the product associated with the recommendation.

By using embodiments of the present invention, a user is provided recommendations for products and services in a visually appealing manner based on their personal preferences and profile. Accordingly, one or more of the methodologies discussed herein may obviate a need for separate searching of products and services by the user, which may have the technical effect of reducing computing resources used by one or more devices within the system. Examples of such computing resources include, without limitation, processor cycles, network traffic, memory usage, storage space, and power consumption.

Figure 1:
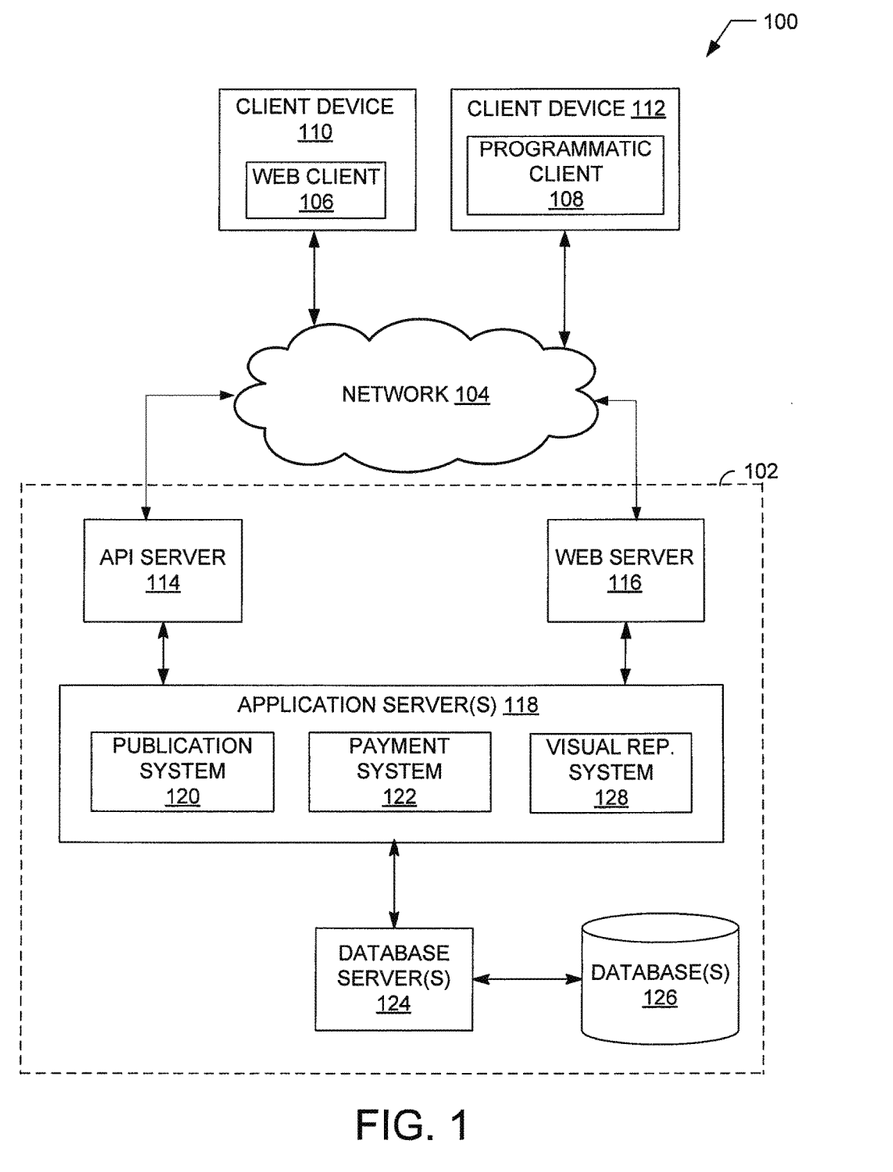
FIG. 1 is a block diagram illustrating an example embodiment of a network architecture of a system used to provide proximity visual recommendations.

With reference to FIG. 1, an example embodiment of a high-level, client-server network architecture 100 to provide three-dimensional proximity recommendations is shown. A networked system 102, in an example form of a network-server functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State, and a programmatic client 108 executing on respective client devices 110 and 112.

The client devices 110 and 112 may comprise a mobile phone, desktop computer, laptop, or any other communication device that a user may utilize to access the networked system 102. In some embodiments, the client devices 110 may comprise or be connectable to an image capture device (e.g., camera). The client device 110 may also comprise a voice recognition module (not shown) to receive audio input and a display module (not shown) to display information (e.g., in the form of user interfaces). In further embodiments, the client device 110 may comprise one or more of a touch screen, accelerometer, and global positioning system (GPS) device.

An application program interface (API) server 114 and a web server 116 are communicatively coupled to, and provide programmatic and web interfaces respectively to, one or more application servers 118. The application servers 118 host a publication system 120, a payment system 122, and a visual representation system 128, each of which may comprise one or more modules, applications, or engines, and each of which may be embodied as hardware, software, firmware, or any combination thereof. The application servers 118 are, in turn, communicatively coupled to one or more database servers 124 facilitating access to one or more information storage repositories or database(s) 126. In one embodiment, the databases 126 may comprise a knowledge database that may be updated with content, user preferences, user profiles, and user interactions (e.g., feedback, surveys, browsing history, or purchase history).

The publication system 120 publishes content via a network (e.g., the Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment comprising one or more sellers.

The payment system 122 provides a number of payment services and functions to users. The payment system 122 allows users to accumulate value (e.g., in a commercial currency, such as the U.S. dollar, or a proprietary currency, such as "points") in accounts, and later to redeem the accumulated value for products (e.g., goods or services) that are made available via the publication system 120. The payment system 122 also facilitates payments from a payment mechanism (e.g., a bank account, PayPal, or credit card) for purchases of items via the network-based marketplace. In some embodiments, the payment system 122 allows the use of a virtual currency for payment of goods and services. The virtual currency may be a mobile virtual currency (e.g., usable on a mobile device). Furthermore, the virtual currency may be received from, or based on, interactions with the publication system 120 or the visual representation system 128.

The visual representation system 128 provides a visual architecture or framework on which proximity recommendations may be presented. In one embodiment, the visual representation system 128 provides a virtual world in which the user is a participant. A virtual world comprises a computer-based simulated environment. In other embodiments, the visual representation system 128 may provide a video, movie, game, or any other visual representation that may be presented to a user. While example embodiments are discussed with respect to a three-dimensional visual system, it is noted that embodiments of the present invention may be practiced in a two-dimensional system. Additionally, while the visual representation system 128 is shown as being part of the networked system 102, alternative embodiments may contemplate a visual representation system 128 outside of the networked system 102 but communicatively coupled to the networked system 102.

Additionally, while the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120, payment system 122, and visual representation system 128 may also be implemented as standalone systems or standalone software programs operating under separate hardware platforms, which do not necessarily have networking capabilities.

Figure 2:
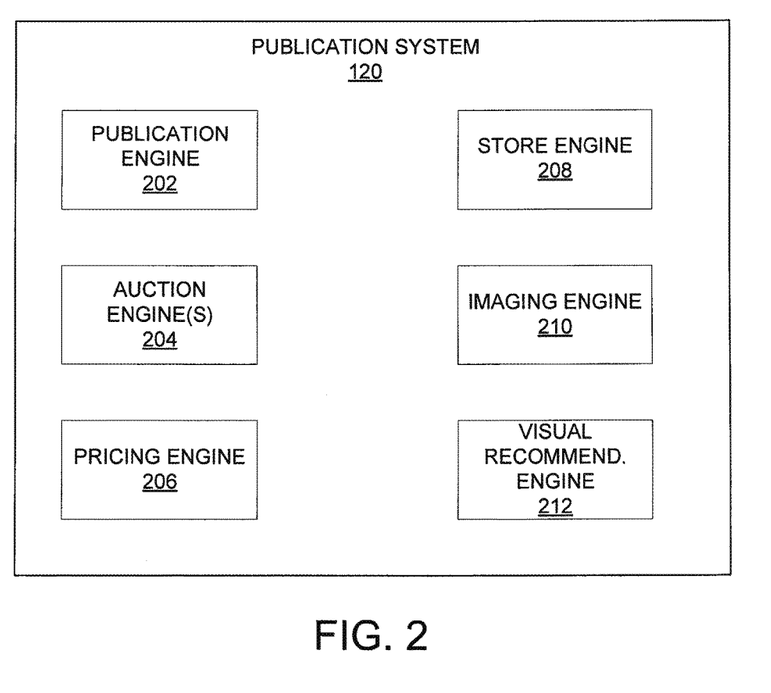
FIG. 2 is a block diagram illustrating an example embodiment of a publication system.

Referring now to FIG. 2, an example block diagram illustrating multiple components that, in one example embodiment, are provided within the publication system 120 of the networked system 102 is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting components whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price-listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" or simulated store, which may be branded and otherwise personalized by and for the seller. Such a virtual store may also offer promotions, incentives, and features that are specific and personalized to the seller. In one example, the seller may offer a plurality of items as Buy-It-Now items in the virtual store, a plurality of items for auction, or a combination of both.

In order to make listings available via the networked system 102 as visually informing and attractive as possible, the publication system 120 may include an imaging engine 210 that enables users to upload images for inclusion within listings and to incorporate images within viewed listings. The uploaded images may also be used in generating the proximity recommendation that is presented to the user by the visual representation system 128 as will be discussed in more detail below.

The visual recommendation engine 212 performs analysis at the publication system 120 in order to provide one or more product recommendations. In example embodiments, the visual recommendation engine 212 may determine product (e.g., goods or services) recommendations based on a user profile, preferences, and past interactions with the publication system 120 or the visual representation system 128. The visual recommendation engine 212 may then prepare, in accordance with some embodiments, visual representations of the product recommendations. The visual recommendation engine 212 will be discussed in more detail in connection with FIG. 3.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
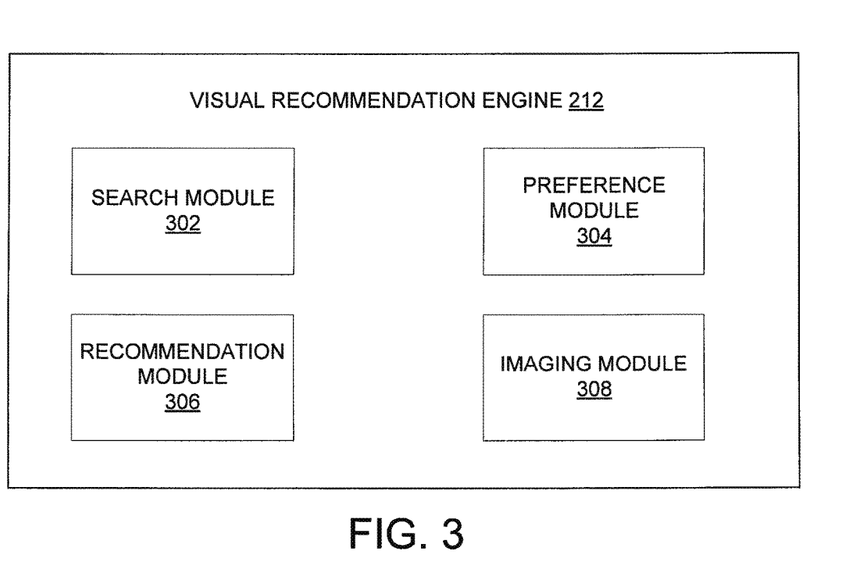
FIG. 3 is a block diagram illustrating an example embodiment of a visual recommendation engine.

Referring now to FIG. 3, an example diagram of the visual recommendation engine 212 is shown. In example embodiments, the visual recommendation engine 212 comprises a search module 302, a preference module 304, a recommendation module 306, and an imaging module 308, which may be communicatively coupled together. In alternative embodiments, one or more of the modules depicted within the visual recommendation engine 212 may be located within another component of the system 120 (e.g., within the imaging engine 210) or the visual representation system 128.

The search module 302 selects inventory from the dynamic marketplace to present to a particular user. Initially, the search module 302 accesses the marketplace (e.g., content stored in the databases 126 via the database servers 124). The content in the marketplace may comprise listings of goods or services that a user (e.g., a seller) wishes to transact via the publication system 120. Additionally, the content may be at least partially generated by a user (e.g., seller). In one embodiment, the dynamic marketplace has listings that change (e.g., addition and removal of listings). However, it should be noted that embodiments of the present invention may be used in any type of marketplace (e.g., catalog).

In some embodiments, the search module 302 determines the select inventory based on attributes (e.g., subject matter of the visual representation, actions performed in the visual representation) associated with the visual representation system 128. For example, if the visual representation being presented to the user by the visual representation system 128 is a movie about surfers at a beach in a virtual world, the search module 302 may search for inventory associated with surfing (e.g., surf boards, surfing clothing, or hotels near beaches). In another example, the user may decide to have their avatar go surfing, and the search module 302 may tailor the search to surfing-related products. As such, the search module 302 may receive attribute information from the visual representation system 128 indicating the subject matter of the visual representation being presented to the user.

In other embodiments, the search module 302 may select inventory based on past interactions of the user within the publication system 120. For example, if the user has recently searched for iPod® accessories, the search module 302 may select inventory directed to iPod® accessories.

The preference module 304 manages user preferences that are used by the recommendation module 306. In example embodiments, the preference module 304 may access a user profile of the user viewing the visual representation. For example, the user may log into the visual representation system 128 or the publication system 120. Using the login, the user is identified, and the user profile may be accessed. In addition to preferences stored in the user profile, the user profile may be associated with or linked to past interactions performed by the user. These past interactions may include past purchases, past browsing history, and past search history on the publication system 120.

Additionally, the user's habits within the visual representation system 128 may be sorted and stored by the preference module 304. For example, the preference module 304 may store the attribute information from the visual representation system 128 indicating the subject matters of the visual representations viewed by the user in the past. The preference module 304 may also store any browsing and purchases as a result of past visual recommendations provided to the user and selected by the user for further viewing.

The recommendation module 306 incorporates preferences and past interaction data accessed by the preference module 304 in prioritizing the list of inventory determined by the search module 302 for recommendation to the user. As such, the recommendation module 306 may incorporate user preferences (e.g., colors, sizes, or brands) stored in a user profile of the user. In addition or alternatively, the recommendation module 306 may incorporate past purchase history of the user. For example, if the user has purchased particular brands or from a particular seller in the past, then any inventory that is associated with these brands or sellers may be prioritized higher for recommendation. The recommendation module 306 may also, in addition or alternatively, incorporate user browsing history in prioritizing the content. For example, the user may have been recently browsing products of a particular brand or seller. In these cases, the content for these particular brands or sellers will be prioritized higher for recommendation. In one embodiment, preferences or past interactions that results from interactions with previous recommendations may be weighted higher in priority than preferences and past interactions resulting from only the publication system 120.

In one embodiment, the weighting on the type of information used by the recommendation module 308 in prioritizing the list may be default. Alternatively or in addition, the user may adjust or set preferences for incorporation of various types of information for prioritization of recommendations. For example, the user may indicate that the past purchase history is less relevant than browsing history over the last week or that only a particular related user's interactions should be considered (e.g., their best friend). Such weightings may be stored in the user's profile.

The imaging module 308 may prepare an image of the one or more highest recommended (e.g., priority) inventory. For example, the imaging module 308 may take the top three items from the inventory list prioritized by the recommendation module 306. An image, associated text, or both, of each of these items may be retrieved from the database 126. The image is then sent to the visual representation system 128 for incorporation into a visual representation.

The visual representation system 128 provides a visual architecture or framework for visual representations on which visual proximity recommendations may be presented. In example embodiments shown in FIG. 4, the visual representation system 128 comprises an integration module 402, a presentation module 404, a content exchange module 406, and a virtual currency module 408, which may be communicatively coupled together. In alternative embodiments, one or more of the modules depicted within the visual representation system 128 may be located within other systems (e.g., within the publication system 120). In general, components, protocols, structures, and techniques not directly related to functions of example embodiments have not been shown or discussed in detail.

Figure 4:
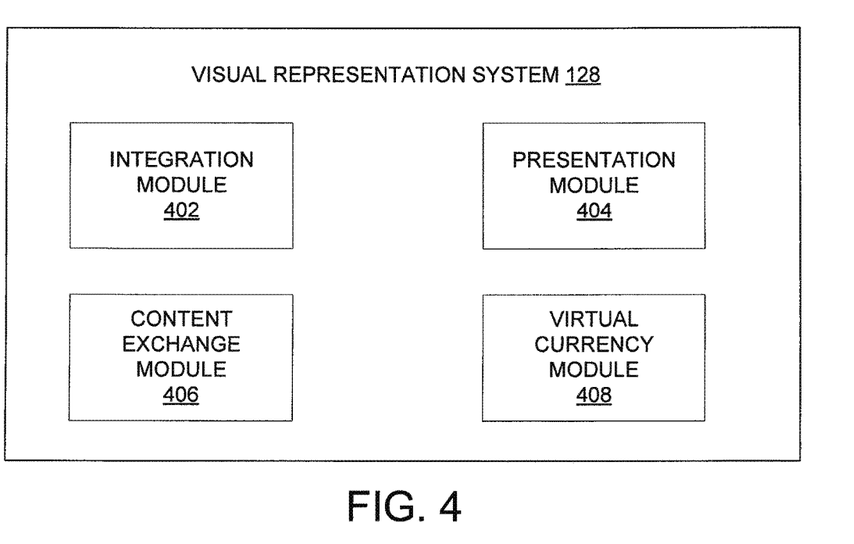
FIG. 4 is a block diagram illustrating an example embodiment of a visual representation system.

In example embodiments, the integration module 402 integrates the recommendation from the publication system 120 into a visual representation and generates a composite visual representation. In one embodiment, the integration module 402 receives an image or other information related to the top inventory from the prioritized recommendation inventory list (e.g., the visual recommendation). The visual representation includes objects in which images or textual information may be embedded by the integration module 402.

In example embodiments, integration module 402 determines prominence of objects. Information regarding the highest recommended inventory item may then be embedded into the most prominent object, while the next highest priority inventory item is embedded into the next most prominent object, and so on. The most prominent object may be an object appearing closest in three-dimensional space to the viewing user. Thus, products or inventory items that are more relevant to the user are shown as being visually closer to the user, whereby the z-value (in a virtual three-dimensional space) is based on preference information of the user. In alternative embodiments, the most prominent object may be an object largest in size or an object closest to the user's avatar in the visual representation. Examples of sample visual representations are discussed in more detail in connection with FIG. 8a and FIG. 8b.

Once the composite visual representation including the visual recommendation is generated by the integration module 402, the presentation module 404 presents the composite visual representation to the user. In one embodiment, the composite visual representation is a virtual world displayed in three-dimensional space. In other embodiments, the visual representation is a movie, video, game, or other types of images which may also be displayed in three-dimensional space.

Each of the embedded visual recommendations in the composite visual representation is actionable (e.g., selectable). For example, a user may click on an object containing a visual recommendation. Once selected, the content exchange module 406 provides access to data corresponding to the selected visual recommendation. In one embodiment, the content exchange module 406 may cause a pop-up window to be displayed in which a web page including more information corresponding to the selected visual recommendation may be presented to the user. In one instance, the pop-up window contains a redirect URL to the publication system 120 and displays a listing from the publication system 120 corresponding to the selected visual recommendation. In other instances, the content exchange module 406 may retrieve data from the publication system 120 corresponding to the selected visual recommendation and present the retrieved data to user (e.g., in the pop-up window).

In some embodiments, the content exchange module 406 also provides a record of user interactions with the visual representation system 128 to the publication system 120. The record may be used to update the user's profile and preferences within the publication system 120. Examples of user interactions include, but are not limited to, attributes of the selected visual representation (e.g., gaming type, movie subject matter, or virtual world subject matter), past selection of visual recommendations provided by the visual representation system 128, and interactions with other users of the visual representation system.

In some embodiments, the user may accumulate virtual currency (e.g., currency used in the virtual world) while interacting with the visual representation system 128. The virtual currency may be used to fund purchases on the publication system 120. Additionally or alternatively, purchases on the publication system 120 using real currency may result in the awarding of promotional or virtual currency, which may be used in the visual representation system 128 or the publication system 120. For example, if the user buys an item facilitated by the publication system 120 for $10 in cash, the user may receive $10 in virtual currency, which the user may use in a gaming visual representation to purchase items in a gaming environment. The virtual currency module 408 manages the virtual currency on the visual representation system 128.

Figure 5:
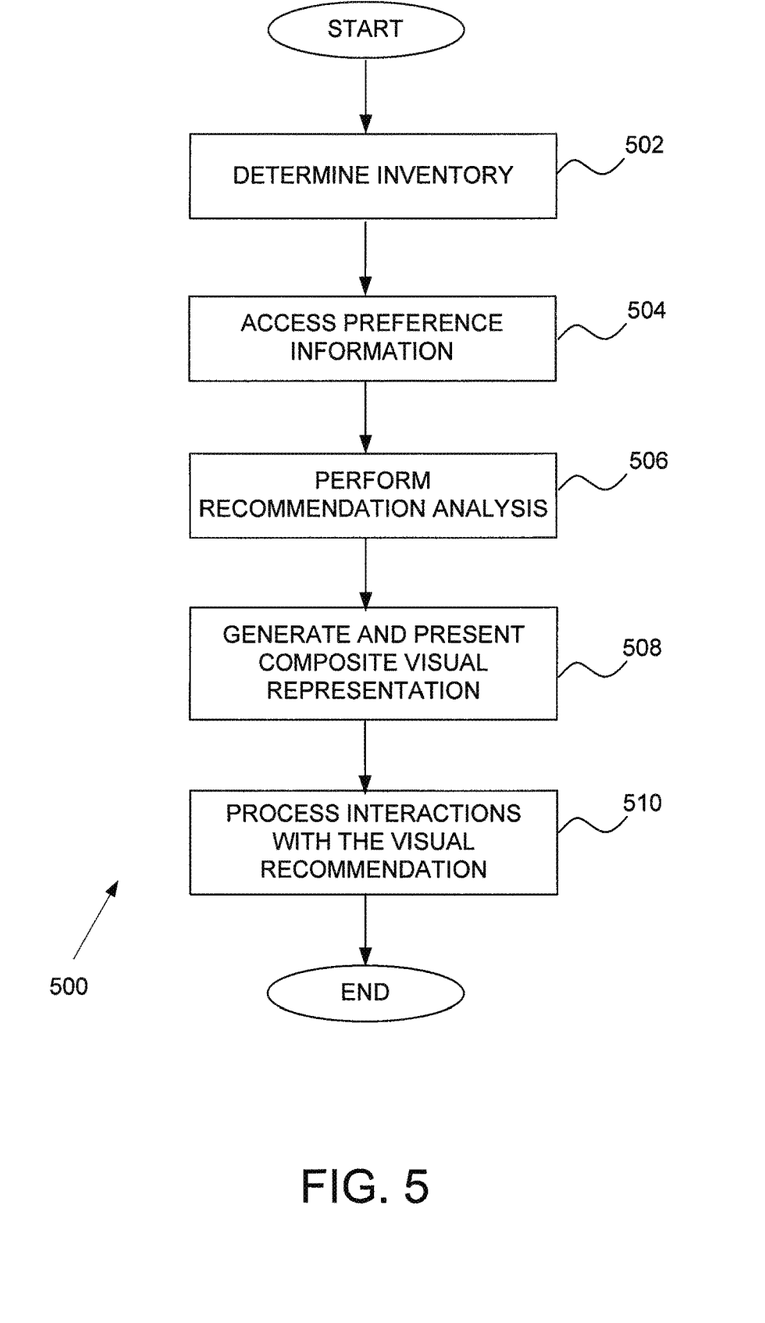
FIG. 5 is a flow diagram of an example method for providing proximity visual recommendation.

FIG. 5 is a flow diagram of an example method 500 for providing proximity visual recommendations. Initially, inventory of interest for a user is determined in operation 502. In one embodiment, the search module 302 performs a search for inventory that may be relevant to a user based on past interactions by the user with the publication system. Additionally or alternatively, the determined inventory may be related to the subject matter of the visual representation being viewed by the user. The determined inventory may comprise a list of at least one item available from the publication system 120.

Preference information is accessed in operation 504 by the preference module 304. In one embodiment, the preference information may be stored or otherwise associated with the user's account in the publication system 120. Alternatively, the preference information may be stored at the visual representation system 128.

Using the preference information, the inventory determined in operation 502 is prioritized by a recommendation analysis performed by the recommendation module 306 in operation 506. The recommendation analysis operation may include one or more weightings based on past purchase history and past interactions with the publication system 120 or the visual representation system 128. For example, if the user has purchased products while in a similar virtual world, inventory related to these products may be weighted higher than other products.

Once the inventory is prioritized by the recommendation module 306, a composite visual representation is generated in operation 508. In some embodiments, one or more images of the most highly recommended inventory is retrieved by the imaging module 308 and provided to the visual representation system 128 for incorporation into the visual representation. The visual recommendations are embedded such that the most relevant or highest priority visual recommendation is embedded into the most prominent object in a visual representation. Once the composite visual representation is generated, the composite visual representation is presented to the user. Operation 508 will be discussed in more detail in connection with FIG. 6 below.

In operation 510, interactions with the recommendation visual representation are processed. These interactions may include a selection of a visual recommendation which triggers an exchange of information with the publication system 120. Operation 510 will be discussed in more detail in connection with FIG. 7 below.

Figure 6:
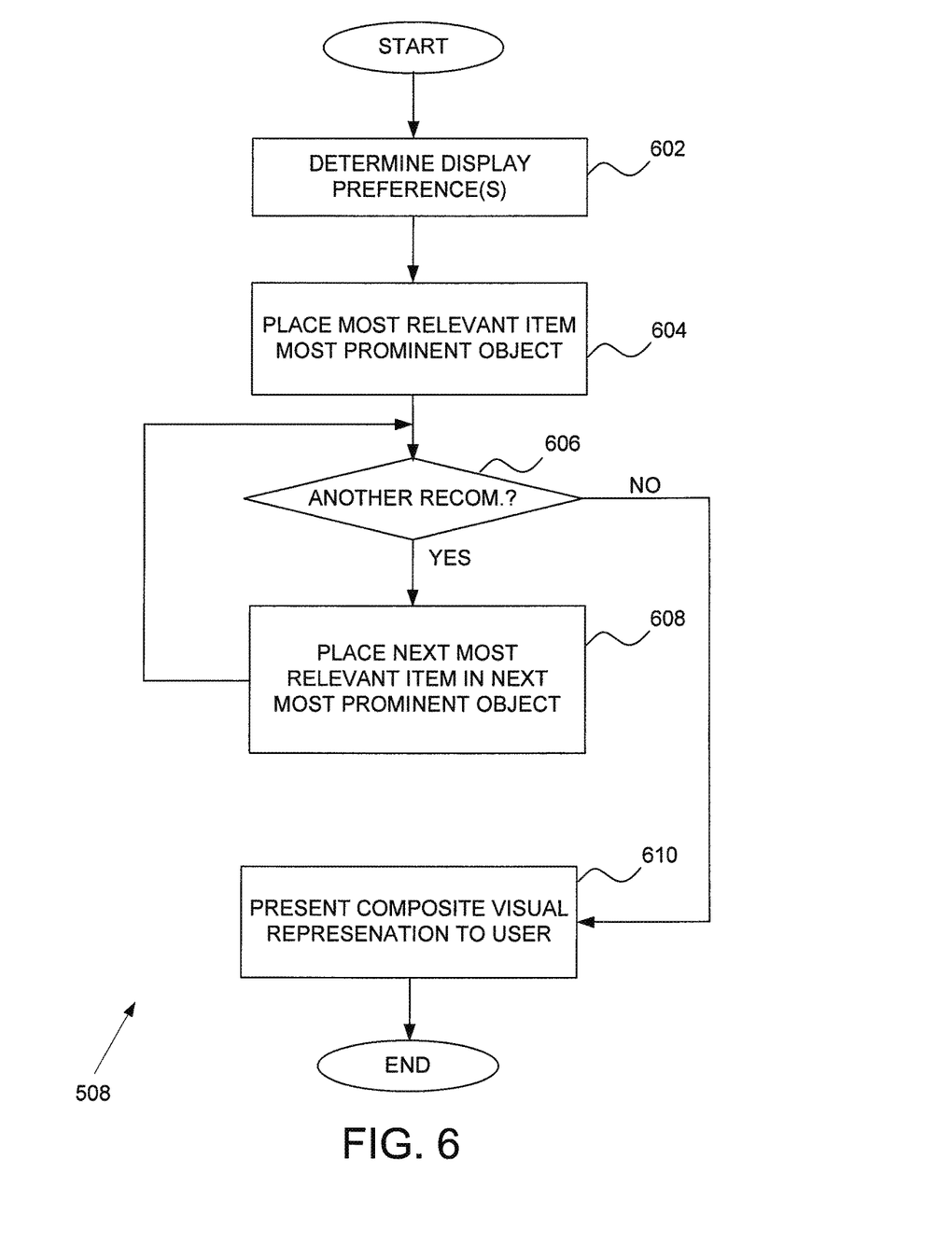
FIG. 6 is a flow diagram of an example method for generating a composite visual representation.

Referring now to FIG. 6, a flow diagram of an example method (e.g., operation 508) for generating the composite visual representation is provided. In operation 602, the user's display preferences are determined. The integration module 402 may access a user profile at the visual representation system 128 to determine the display preferences. For example, the user may normally view the visual representation on a particular mobile device. As such, the display preferences may be directed to optimizing the visual representation for display on the particular mobile device.

In operation 604, the most relevant item is positioned in the most prominent object on the visual representation by the integration module 402. In one instance, the most prominent object is an object that appears closest in a virtual three-dimensional space to the viewing user. The object may be embedded into the object in a manner consistent with the display preferences. As such, the object essentially illustrates an advertisement for a product that may be highly relevant to the user.

A determination is performed in operation 606 as to whether another visual recommendation is to be provided. If another visual recommendation is to be provided, then the next most relevant item is positioned in the next more prominent object by the integration module 402 in operation 608. The process continues iteratively until there are no more visual recommendations to be provided. For example, the maximum number of visual recommendations may be reached and no further visual recommendations can be provided. When this occurs, the composite visual representation is presented to the user in operation 610.

It is noted that the relevant item being recommended may comprise an actual item from a particular seller (e.g., iPod® from Seller Joe Smith), a series of items (e.g., iPods® from a plurality of different sellers), a product category (e.g., iPods® and iPod® accessories), or any combination of these.

Figure 7:
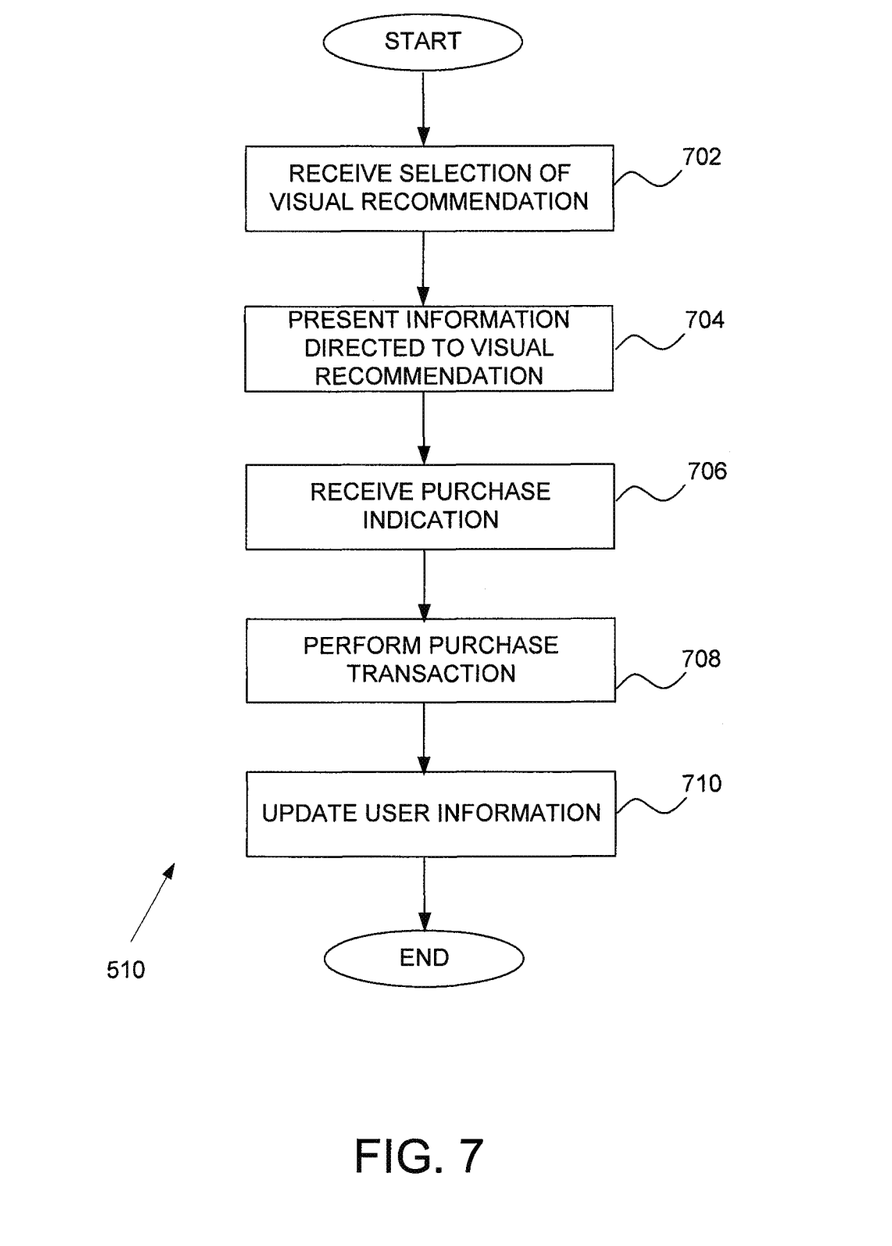
FIG. 7 is a flow diagram of an example method for process interactions triggered by a selection of a visual recommendation.

Referring now to FIG. 7, a flow diagram of an example method (e.g., operation 510) for process interactions triggered by a selection of a visual recommendation is provided. In operation 702, a selection of a visual recommendation is received. In one embodiment, the content exchange module 406 receives the selection.

Information directed to the selected visual recommendation is presented in operation 704. The content exchange module 406 may access information corresponding to the selected visual recommendation. In one embodiment, the content exchange module 406 may cause a pop-up window to be displayed in which a web page corresponding to the selected visual recommendation may be presented to the user. In one instance, the pop-up window may display a listing or a series of listings from the publication system 120 for the selected visual recommendation.

In operation 706, a purchase indication is received. For example, the user may indicate in the pop-up window a desire to purchase the item. A purchase transaction is performed in operation 708. In one embodiment, the content exchange module 406 may act as an information middleman to instruct the publication system 120 to complete the purchase transaction. In an alternative embodiment, the user may be transferred to the publication system 120 to complete the purchase transaction. In some embodiments, the user may accumulate virtual currency while interacting with the visual representation system 128. The virtual currency may be used to fund purchases on the publication system 120.

In operation 710, the stored user information for the user is updated by the publication system 120. In example embodiments, the user's profile or preferences with the publication system 120 and the visual representation system 128 may be updated. For example, the user's browse history and purchase history may be updated to indicate that the user browsed and purchased the recommended item. Other examples of user interactions which may be stored include, but are not limited to, attributes of the visual representation (e.g., subject matter of the visual representation, actions performed in the visual representation) being viewed, and interactions with other users of the visual representation system immediate prior to the purchase.

Virtual currency earned at either the publication system 120 or the visual representation system 128 may also be updated in one or more user accounts or profiles. In one embodiment, purchases on the publication system 120 using real currency may result in awarding of promotional currency or virtual currency, which may be used in the visual representation system 128. For example, if the user buys an item on the publication system 120 for $10 in cash, the user may receive $10 in virtual currency, which the user may use in a gaming visual representation to purchase items in the gaming environment. The virtual currency earned may be updated in an account of the user in the visual representation system 128.

Figure 8A:
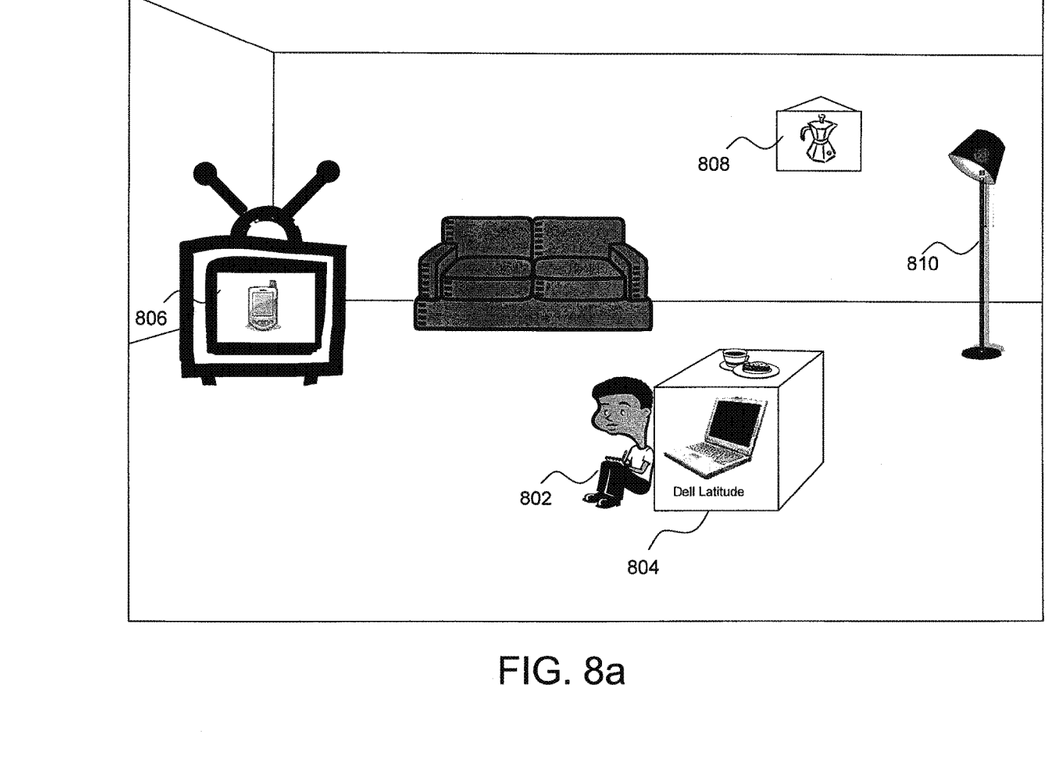
FIG. 8*a* and FIG. 8*b* are examples of composite visual representations.

FIG. 8a is one example of a composite visual representation generated by the integration module 402. In this example, the user is represented by an avatar 802. Based on the user profile, preferences, and past interactions, the recommendation module 306 determined that the user is interested in laptop computers, smart phones, coffee makers, and lamps, in that particular order.

Located most prominently to the avatar and the viewing user is a first object 804 displaying a Dell Latitude® laptop computer (e.g., "laptop"). As such, the first object 804 may provide a category of goods (e.g., Dell Latitude® laptops) that the user may be most interested in purchasing. For example, the user may have recently performed an extensive search for Dell Latitude® laptops on the publication system 120. Alternatively, the first object 804 may recommend a particular Dell Latitude® laptop that is available for purchase (e.g., based on a favorite merchant, past price range paid for similar goods).

The next most prominent object 806 (e.g., based on proximity to the viewing user) recommends a smart phone (e.g., either a category of smart phones or a particular smart phone) based on user profile, preferences, and past interactions. Similarly, a third object 808 recommends a coffee maker. It is noted that the recommendation does not need to be shown within an object (e.g., within a box). Instead, an object may be seamlessly integrated into the environment. For example, a floor lamp 810 is being recommended to the user.

In accordance with one embodiment, when the user moves a cursor over a visual recommendation, the visual recommendation may alter its appearance to indicate that it is selectable. In one embodiment, the presentation module 404 performs the altering. For instance, the coffee maker in the third object 808 may become highlighted, flash, or change colors.

Figure 8B:
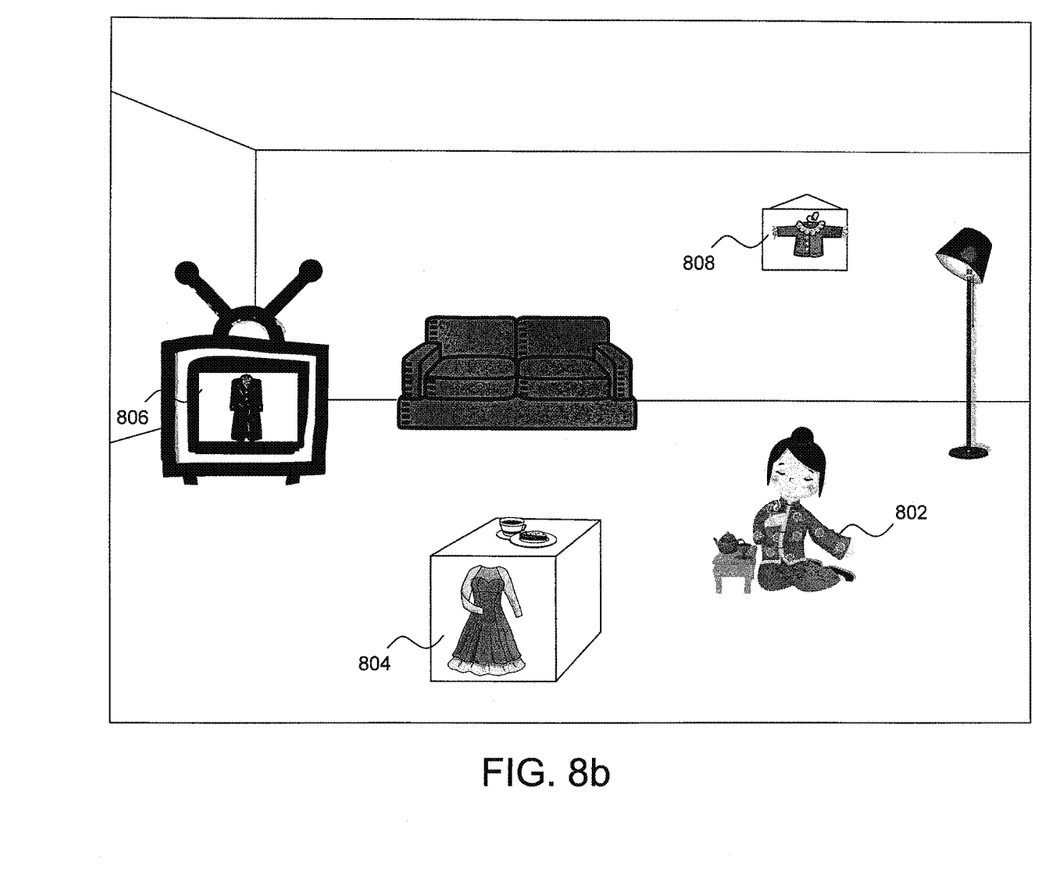

FIG. 8b is another example of a composite visual representation generated by the integration module 402. In this example, the viewing user may select various items of clothing being recommended. The user's avatar 802 may be illustrated trying on various items of clothing that are selected. In one embodiment, the user may take a digital image of herself to be used as the avatar 802 in order to try on the various items of clothing. For example, if the user selects a dress recommended in the most prominent object 804, the avatar 802 may be shown wearing the selected dress. In example embodiments, the integration module 402 may incorporate the selected article of clothing onto the avatar. Similarly, a coat in the next most prominent object 806 or a sweater shown in the third object 808 may be selected. In example embodiments, the farther away a visual recommendation appears to be positioned from the avatar or the viewing user, the lower the recommendation is for the user. Thus, in the present example, the dress represented in the most prominent object 804 is more likely to be selected by the user, while the sweater in the third object 808 is less likely to be selected.

While the examples of FIG. 8a and FIG. 8b are shown as virtual worlds, embodiments of the present invention may be practiced in any visual environment. For example, visual proximity recommendations may be provided in a gaming environment or in a movie being viewed by the user.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 9:
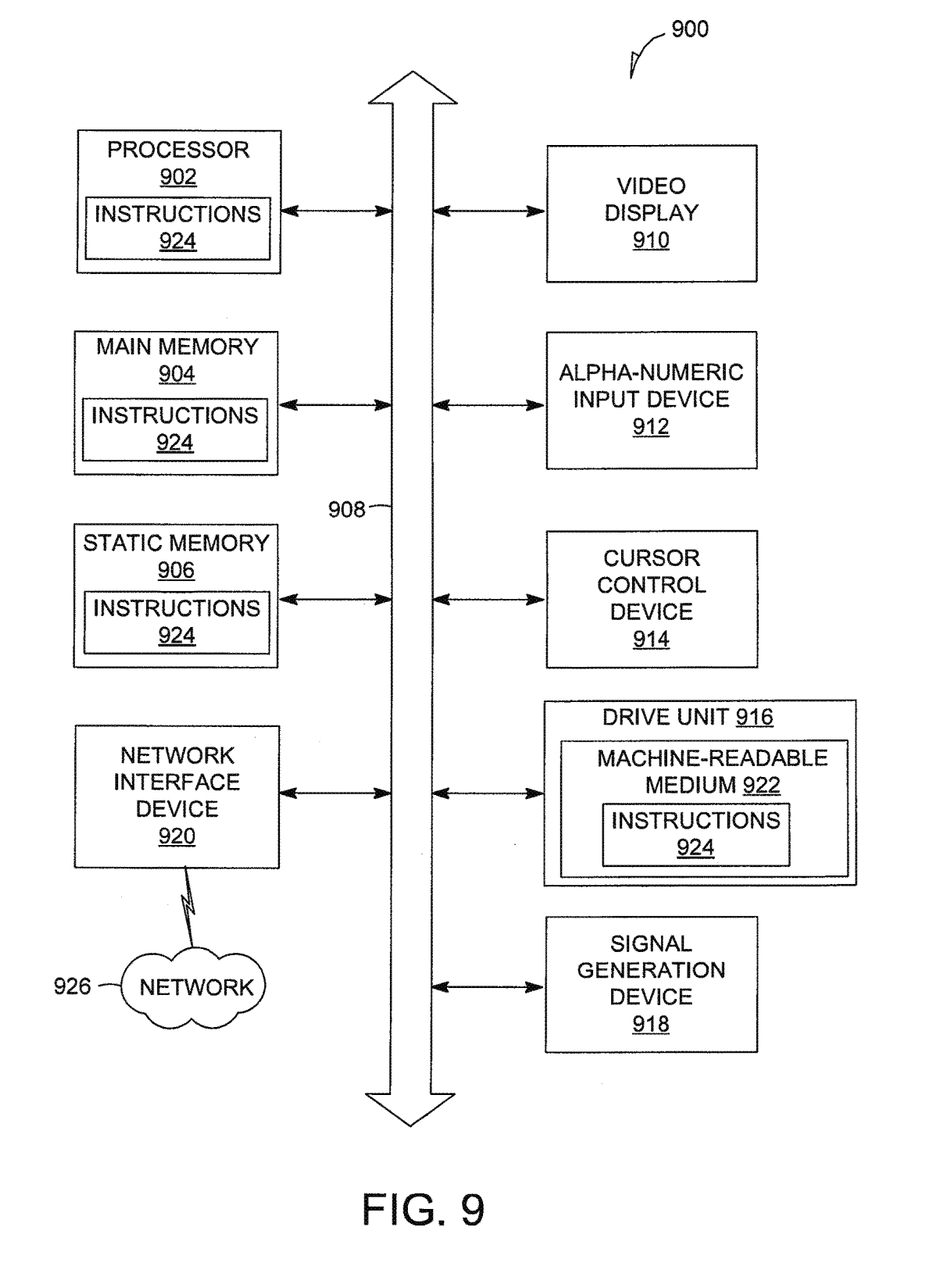
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Storage Medium

The disk drive unit 916 includes a machine-readable storage medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, with the main memory 904 and the processor 902 also constituting machine-readable storage media.

While the machine-readable storage medium 922 is shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable storage medium" shall also be taken to include any non-transitory storage medium.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

identifying, by a visual representation system displaying a visual representation of a virtual world, attribute information indicating a subject matter of both an environment depicted in the virtual world and an activity related to the environment being performed by an avatar controlled by a user;

transmitting the attribute information to a visual recommendation engine;

using the attribute information indicating the subject matter of both the environment depicted in virtual world and the activity related to the environment being performed by the avatar, performing, by the visual recommendation engine, a search of a coupled database for a plurality of items that match the attribute information indicating the subject matter of both the environment depicted in the virtual world and the activity related to the environment being performed by the avatar;

prioritizing the plurality of items based on preferences and past interactions of the user;

based on the prioritizing, determining a top number of prioritized items from the plurality of items;

for each of the top number of prioritized items, retrieving an image that represents each of the top number of prioritized items and transmitting the retrieved images to the visual representation system;

generating, using a hardware processor of the visual representation system, a composite visual representation by embedding the retrieved images into pre-existing objects of the visual representation of the virtual world;

causing presentation of a view of the composite visual representation to the user that shows the pre-existing objects of the visual representation of the virtual world having the embedded images;

receiving a selection of one of the embedded images in the composite visual representation; and in response to the receiving of the selection, causing presentation of the avatar interacting with a prioritized item represented by the selected one of the embedded images.

2. The method of claim 1, wherein the generating comprises embedding the retrieved images of higher prioritized items into pre-existing objects of the virtual world in closer spatial proximity to the avatar.

3. The method of claim 1, wherein the generating comprises embedding an image of a highest prioritized item in a largest pre-existing object in size in the visual representation of the virtual world.

4. The method of claim 1, wherein the causing presentation of the avatar interacting with the prioritized item within the composite visual representation comprises causing the avatar, created from a digital image of the user, to be displayed wearing an article of clothing corresponding to the selected one of the embedded images of the prioritized item.

5. The method of claim 1, wherein the prioritizing comprises:
accessing stored past browsing history of the user; and
using the past browsing history to prioritize the plurality of items.

6. The method of claim 1, wherein the prioritizing comprises:
accessing a past purchase history of the user; and
using the past purchase history to prioritize the plurality of items.

7. The method of claim 1, wherein the prioritizing comprises applying a weight based on a type of information used to prioritize the plurality of items.

8. The method of claim 1, further comprising:
in response to the receiving of the selection, causing display of a pop-up window comprising more information corresponding to the prioritized item represented by the selected one of the embedded images.

9. The method of claim 8, wherein the pop-up window displays one or more listings for the prioritized item from a publication system.

10. A system comprising:
one or more hardware processors; and
a storage device storing instructions that, when executed by the one or more hardware processors, cause the one or more hardware processors to perform operations comprising:
identifying, by a visual representation system displaying a visual representation of a virtual world, attribute information indicating a subject matter of both an environment depicted in the virtual world and an activity related to the environment being performed by an avatar controlled by a user;
transmitting the attribute information to a visual recommendation engine;
using the attribute information indicating the subject matter of both the environment depicted in virtual world and the activity related to the environment being performed by the avatar, performing, by the visual recommendation engine, a search of a coupled database for a plurality of items that match the attribute information indicating the subject matter of both the environment depicted in the virtual world and the activity related to the environment being performed by the avatar;
prioritizing the plurality of items based on preferences and past interactions of the user;
based on the prioritizing, determining a top number of prioritized items from the plurality of items;
for each of the top number of prioritized items, retrieving an image that represents each of the top number of prioritized items and transmitting the retrieved images to the visual representation system;
generating a composite visual representation by embedding the retrieved images into pre-existing objects of the visual representation of the virtual world;
causing presentation of a view of the composite visual representation to the user that shows the pre-existing objects of the visual representation of the virtual world having the embedded images;
receiving a selection of one of the embedded images in the composite visual representation; and
in response to the receiving of the selection, causing presentation of the avatar interacting with a prioritized item represented by the selected one of the embedded images.

11. The system of claim 10, wherein the generating comprises embedding the retrieved images of higher prioritized items into pre-existing objects of the virtual world in closer spatial proximity to the user.

12. The system of claim 10, wherein the generating comprises embedding an image of a highest prioritized item in a largest pre-existing object in size in the visual representation of the virtual world.

13. The system of claim 10, wherein the prioritizing comprises applying a weight based on a type of information used to prioritize the plurality of items.

14. The system of claim 10, wherein the operations further comprise:
in response to the receiving of the selection, causing display of a pop-up window comprising more information corresponding to the prioritized item represented by the selected one of the embedded images.

15. The system of claim 14, wherein the pop-up window displays one or more listings for the prioritized item from a publication system.

16. A machine-readable storage medium storing instructions which, when executed by at least one processor of a machine, cause the machine to perform operations comprising:
identifying, by a visual representation system displaying a visual representation of a virtual world, attribute information indicating a subject matter of both an environment depicted in the virtual world and an activity related to the environment being performed by an avatar controlled by a user;
transmitting the attribute information to a visual recommendation engine;
using the attribute information indicating the subject matter of both the environment depicted in virtual world and the activity related to the environment being performed by the avatar, performing, by the visual recommendation engine, a search of a coupled database for a plurality of items that match the attribute information indicating the subject matter of both the environment depicted in the virtual world and the activity related to the environment being performed by the avatar;
prioritizing the plurality of items based on preferences and past interactions of the user;
based on the prioritizing, determining a top number of prioritized items from the plurality of items;
for each of the top number of prioritized items, retrieving an image that represents each of the top number of prioritized items and transmitting the retrieved images to the visual representation system;
generating a composite visual representation by embedding the retrieved images into pre-existing objects of the visual representation of the virtual world;

causing presentation of a view of the composite visual representation to the user that shows the pre-existing objects of the visual representation of the virtual world having the embedded images;

receiving a selection of one of the embedded images in the composite visual representation; and in response to the receiving of the selection, causing presentation of the avatar interacting with a prioritized item represented by the selected one of the embedded images.

17. The machine-readable storage medium of claim 16, wherein the generating comprises embedding the retrieved images of higher prioritized items into pre-existing objects in closer spatial proximity to the user.

18. The machine-readable storage medium of claim 16, wherein the generating comprises embedding an image of a highest prioritized item in a largest pre-existing object in size in the visual representation.

19. The machine-readable storage medium of claim 16, wherein the prioritizing comprises applying a weight based on a type of information used to prioritize the plurality of items.

20. The machine-readable storage medium of claim 16, wherein the operations further comprise:

in response to the receiving of the selection, causing display of a pop-up window comprising more information corresponding to the prioritized item represented by the selected one of the embedded images.

\* \* \* \* \*